United States Patent [19]

Wicker

[11] Patent Number: 4,697,541
[45] Date of Patent: Oct. 6, 1987

[54] CROSSING CONTROL ARM FOR VEHICLES

[75] Inventor: James H. Wicker, Charlotte, N.C.

[73] Assignee: Specialty Manufacturing Company, Charlotte, N.C.

[21] Appl. No.: 423,621

[22] Filed: Sep. 27, 1982

[51] Int. Cl.$^4$ .............................................. B60Q 11/00
[52] U.S. Cl. ................................... 116/28 R; 293/9; 293/117
[58] Field of Search ............... 116/28 R, 51, 52, 63 R, 116/284, 285; 293/117, 149, 146, 148, 150, 9, 21, 22, 23, 118, 119; 340/130, 133

[56] References Cited

U.S. PATENT DOCUMENTS

| | | | |
|---|---|---|---|
| 1,727,838 | 9/1929 | Miyaoka | 116/285 |
| 2,196,561 | 4/1940 | Lester | 293/149 |
| 3,153,398 | 10/1964 | La Verne Runkle | 116/28 R |
| 3,236,552 | 2/1966 | Percifull | 116/28 R |
| 4,052,957 | 10/1977 | Lee | 116/173 |

*Primary Examiner*—Charles Frankfort
*Attorney, Agent, or Firm*—Shefte, Pinckney & Sawyer

[57] ABSTRACT

A crossing arm unit for use on the front of school buses and the like to protect children walking in front of the school bus, the crossing arm unit including a frame attached to the front bumper of the school bus, and a movable arm pivotally mounted in the frame for movement between a retracted position along side the bumper and an extended position projecting outwardly from the bumper. The movable arm includes a pivot plate having a relatively small extending length and being formed of relatively heavy, strong metal, a support plate connected to the pivot plate to extend therefrom, the support plate being formed of a lighter material and having an extending length substantially greater than that of the pivot plate, and a U-shaped metal rod having a closed end portion and leg portions extending along the length of the support plate and being joined thereto at spaced locations, the rod having an extending length from the support plate that is substantially greater than the extending length of the support plate. A conventional drive is provided to move the arm member between its extended and retracted positions.

8 Claims, 5 Drawing Figures

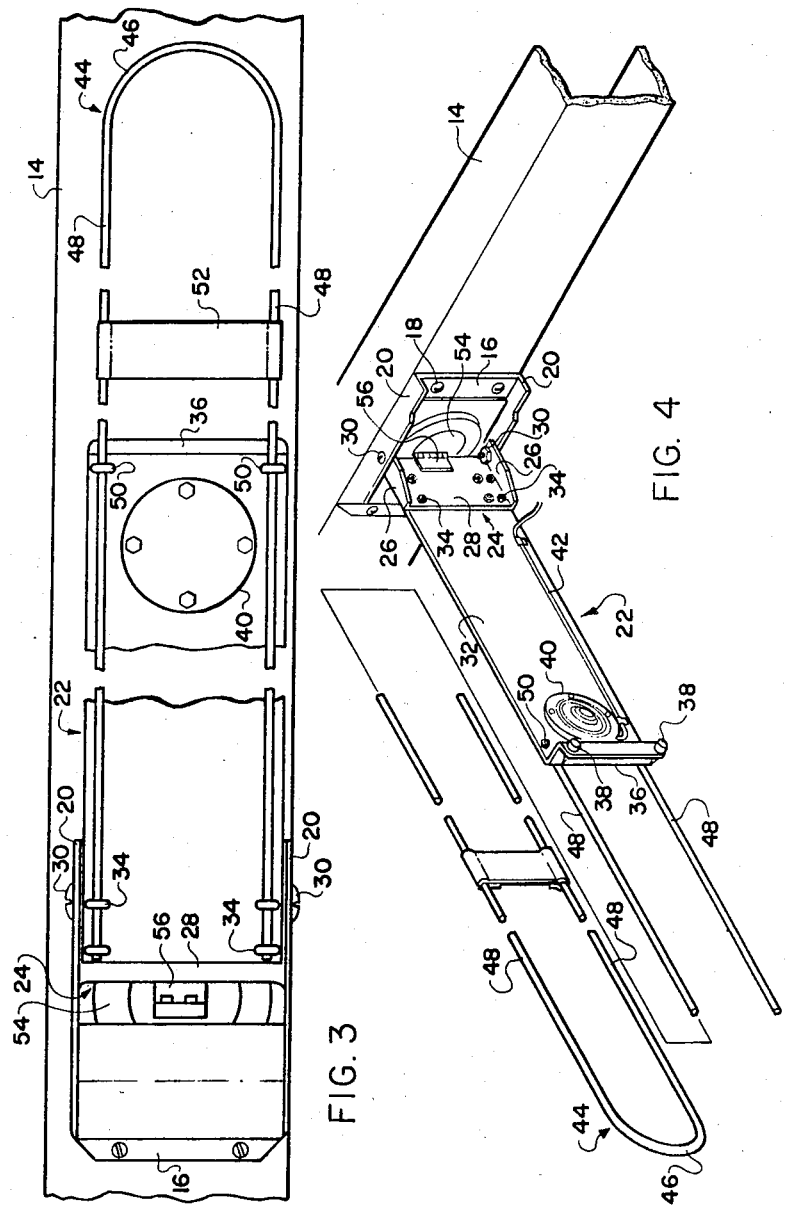

CROSSING CONTROL ARM FOR VEHICLES

BACKGROUND OF THE INVENTION

School buses and similar vehicles are widely used to transport students to and from school and the sites of school-related activities, and in many instances the students are young children. These buses usually travel along preassigned routes and make frequent stops to load or unload children near their residences, and statistics indicate that a large percentage of accidents occurring in the field of student transportation occur during loading and unloading of the children.

One significant hazardous situation for the children occurs when the children leave a stopped school bus and walk in front of the bus to cross the street. In this situation, the driver usually remains in the bus, and if the children are small and walk in front of the bus in close proximity thereto, the driver cannot see that children because the driver's line of sight is impaired by the hood of the school bus so that such line of sight is above the heads of the children walking in front of the bus. Since the driver cannot actually see the children, the driver cannot determine if the children may be walking into a potentially dangerous traffic situation (e.g. moving vehicles passing the stopped school bus) which the children may not be aware of, but which are easily observed from the elevated vantage point of the driver in the bus, and the driver therefore cannot act properly control the movement of the children to avoid such dangerous traffic situations.

In an effort to alleviate the hazards associated with the foregoing situations, it is known to provide school buses with an extended crossing arm that is mounted on the front of the school bus for pivotal movement, controlled by the driver, between a retracted position along side the front bumper of the bus and an extended position at which the arm extends outwardly for a substantial distance in front of the bus. At its extended position, the arm creates a barrier which forces the children walking in front of the bus to go around the extended end of the arm where they will be in the line of sight of the driver and can be observed by the driver. While these known crossing arms have served to accomplish their intended safety function, they nevertheless have certain practical disadvantages.

It will be apparent that the crossing arm must have a substantial extending length so as to insure that the children will walk a sufficient distance in front of the bus to bring them within the line of sight of the driver, yet the crossing arm is only pivotally supported in cantilevered fashion at one of its ends so that the weight of the crossing arm can prevent substantial structural problems in designing a suitable pivotal support for the crossing arm at its extended position.

In an effort to overcome these problems, crossing arms have been made from light-weight fiberglass rods that have a relatively small and simple pivot connection at the bumper of the school bus. While the use of fiberglass takes advantage of the light weight of the material to reduce the aforesaid structural problems associated with mounting the crossing arm in cantilevered fashion at the bumper, these known fiberglass corssing arms also have several disadvantages. First, fiberglass is not resilient enough to permit excessive bending of the rods to form a closed loop, and it is therefore necessary to clamp several straight lengths of fiberglass rods together in a predetermined pattern to form a suitable barrier when the crossing arm is extended. This pattern generally results in the corssing arm that includes a pointed end for the crossing arm which may be hazardous to children, and the crimped brackets or clamps used to hold the several rod pieces together are relatively expensive to install and, because of the crimping, they tend to weaken the fiberglass rods at the points where the brackets are installed. Additionally, since the fiberglass rods are constantly exposed to all types of weather conditions, they tend to deteriorate in time so as either to form splinters that may be safety hazards or to break. Finally, in known types of fiberglass crossing arms, only a small portion of the innermost ends of the fiberglass rods are supported at the pivotal connections therefor, and this limited support for the lengthy crossing arms has a tendency to result in the crossing arms drooping or sagging in a downward direction from the pivot connection.

In accordance with the present invention, a crossing arm is provided which eliminates the necessity of using fiberglass and its attendant disadvantages, while providing a crossing arm that is properly supported, relatively inexpensive and easy to produce.

SUMMARY OF THE INVENTION

The crossing arm unit of the present invention includes a frame and an extending arm that is mounted in the frame for pivotal movement between a retracted position along side the vehicle bumper and an extended position projecting outwardly from the bumper. The extending arm includes a relatively small pivot plate formed of relatively heavy and strong metal to provide adequate support for the arm at the pivotal connection, a somewhat larger lightweight support plate extending from the pivot plate, and a long metal rod having a closed end portion and two extending leg portions, the ends of which extend along the support plate and are secured thereto to provide proper support for the metal rod even though it has a substantial extent from the support plate.

This construction permits the use of components made from metal, with its obvious advantages in terms of strength and long term reliability, yet the unique arrangement of these components still permit the use of a relatively simple and inexpensive pivotal connection that will maintain the extended crossing arm at its proper horizontal disposition without any significant sag.

In the preferred embodiment of the present invention, the pivot plate is formed of steel, the support plate is formed of lightweight aluminum, and the metal rod is formed with a simple U-shaped configuration that presents a safe, adequate barrier for the children while still being generally lightweight and easy to form and to attach to the support plate.

BRIEF DESCRIPTION OF THE DRAWINGS

FIG. 3 is a front elevational view of the crossing arm shown in FIG. 2;

FIG. 4 is a perspective view illustrating similar to FIG. 2 but showing the crossing arm at its fully extended position.

DESCRIPTION OF THE PREFERRED EMBODIMENT

Figure 1:
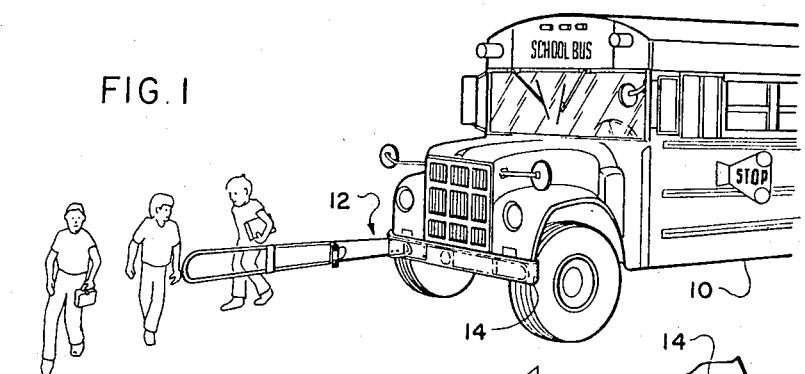
FIG. 1 is a general view illustrating a typical school bus vehicle having a crossing arm of the present invention mounted thereon.

Looking now in greater detail at the accompanying drawings, FIG. 1 illustrates a school bus 10 at a typical stopped position for unloading children, and a crossing arm unit 12 embodying the present invention is shown in full lines at its extended position generally perpendicular to the bumper 14 of the school bus, the crossing arm unit 12 also being shown in dotted lines at its retracted position along side and adjacent to the bumper 14. It will be noted that because the crossing arm unit 12, at its extended position, has a substantial length from the bumper 14, the children leaving the school bus and walking in front thereof must walk around the end of the barrier presented by the crossing arm unit 12 so that they are well within the line of sight of the driver of the school bus 10 as discussed above.

Figure 2:
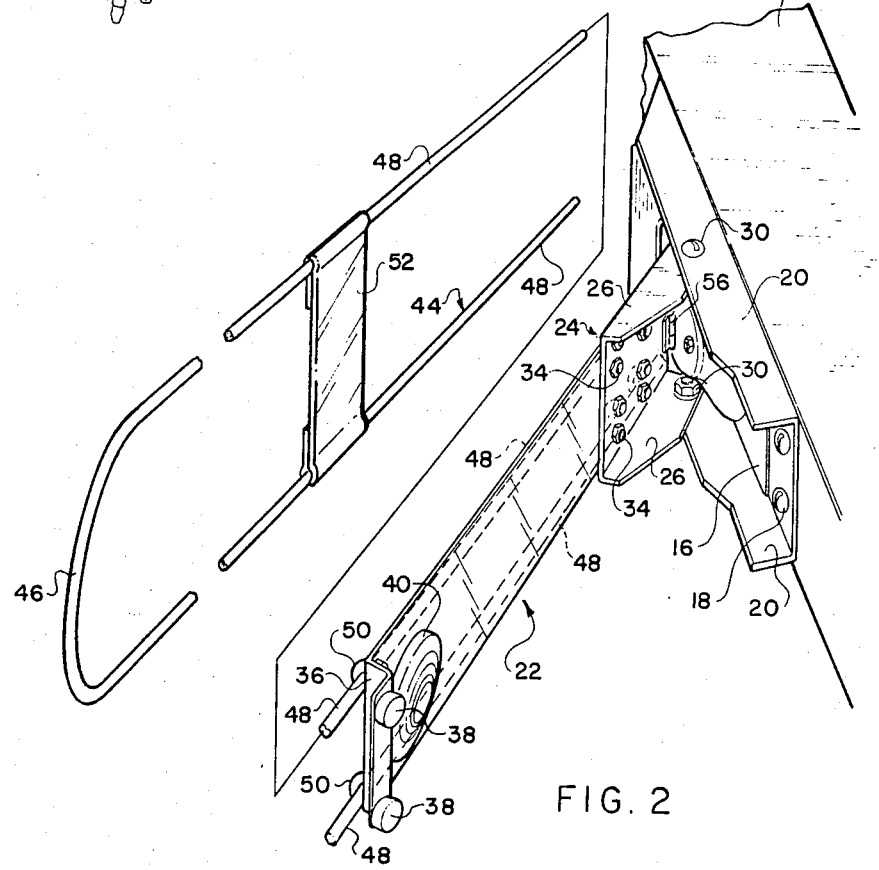
FIG. 2 is a perspective view illustrating one embodiment of the crossing arm of the present invention mounted on a vehicle bumper.

The crossing arm unit 12 is illustrated in greater detail in FIGS. 2–4, and it includes a frame member 16 that is generally U-shaped with its flat central portion being attached directly to the school bus bumper 14 by bolts 18, and with a pair of flanges 20 extending outwardly from the bumper 14 in spaced parallel relation. A movable arm member 22 is mounted in the frame 16 by a pivot plate 24 that is also U-shaped and includes a pair of flanges 26 extending from a center portion 28, the flanges 26 being disposed in abutment with the respective flanges 20 of the frame 16 so that the pivot plate 24 is properly supported by the overlapping portions of the flanges 20 and 26. The pivot plate 24 is pivotably mounted in the frame 16 by a pair of oppositely disposed pivot bolts 30 extending through the aforesaid overlapping portions of the frames 20 and 26, as best seen in FIG. 2.

The movable arm member 22 also includes a thin, flat support plate 32 that is secured to the pivot plate center portion 28 by U-bolts 34 and includes a stepped end portion 36 having resilient buttons 38 secured thereto, the combined extent of the stepped end portion 36 and the buttons 38 being substantially equal to the width of the pivot plate flanges 26 so that when the movable arm member 22 is at its retracted position, it will be disposed essentially parallel to the flat surface of the bumper 14 and with the buttons 38 in contact with such surface to reduce wear and tear on the movable arm member 22 during movement to and from its retracted position. The support plate 32 is also provided, nearing its extending end, with an electric light 40 having an electrical line 42 that leads to a conventional on-off switch (not shown) that can be operated by the driver. The light 40 may be of either a red color or a green color, and would be turned on by the driver to indicate when it is safe or unsafe for the children to pass in front of the bus.

The movable arm member 22 also includes a rod member 44 that is U-shaped to include a closed end portion 46 formed on a radius and a pair of leg portions 48 extending from the closed end 46 in spaced parallel relation. The ends of legs 48 extend along substantially the entire length of the support plat 32 (see FIG. 3) and each leg 48 is attached thereto by the aforesaid U-bolts 34, and by two further U-bolts 50 of which are disposed, respectively, at the opposite end of the support plate 32 from the U-bolts 34 so as to provide a wide base of support for the rod member 44. Preferably, the rod member 44 also includes a strut 52 connected between the legs 48 at a point intermediate its extending length from the support plate 32 to provide additional stability to the rod member 44.

To move the arm member between its retracted (FIG. 3) and extended (FIG. 4) positions, a conventional diaphram 54 is provided in the frame 16, and the diaphram 54 is connected to the pivot plate 24 by a hinge connection 56. As is wellknown in the art, the diaphram 54 may be selectively connected directly to the existing vacuum system of the school bus 10 which is utilized to cause the diaphram 54 to move inwardly or outwardly, to thereby cause the movable arm member 22 to move between its aforesaid retracted and extended positions, such operation being controlled by a switch (not shown) that is operated by the driver in the school bus 10.

To be effective in performing its intended function, it is preferred that the extending length of the movable arm member, at its extended position, should be approximately six feet, and, as discussed above, this significant extent in cantilever-fashion from the pivoted connection at the bumper presents problems in terms of properly supporting the movable arm member while still providing a construction that is relatively simple and within acceptable costs limitations. In the crossing arm unit 22 of the present invention, these competing interests are balanced in a novel manner that satisfies both requirements. The pivot plate 24, which bears virtually all of the load of supporting the extended movable arm member 22, is preferably formed of a sturdy, relatively heavy-gauge metal, such as 14-gauge steel, but it has only a relatively short extending length of approximately three and one-half inches from the pivot bolts 18. Thus, while the pivot plate 24 is strong enough to withstand the supporting load imposed on it by the cantilever arm member 22, it is small enough that its total weight does add significantly to such load. On the other hand, the support plate 32 preferably has an extending length from its connection to the pivot plate 24 of approximately twenty inches, which is substantially greater than the extending length of the pivot plate 24 so as to provide a wide spacing for the U-bolts 34 and 50 that will serve to maintain the rod 44 at a horizontal disposition without any significant sag. However, because the support load imposed on the support plate 32 is less severe than that imposed on the pivot plate 24, the support plate 32 may be formed of a relatively light-gauge metal, preferably aluminum plate having a thickness of approximately 0.08 inches, and this relatively light metal will, of course, reduce the total load imposed on the pivot plate 24 while still adding stability to the movable arm member 22, as a whole, and while still providing the necessary support for the rod 44. The rod 44, as will be apparent in FIGS. 1, 2 and 4, provides the major portion of the extending length of the movable arm 22, preferably having a length of about four feet from the extending end of the support plate 32. This rod is preferably formed from aluminum and has a diameter of one-quarter inch, whereby the rod 44 has sufficient rigidity to maintain its horizontal disposition without adding unduly to the support load imposed on the pivot plate 24. Also, it will be appreciated that the rod 44, because it is formed from a continuous length of material having one curve portion, is inexpensive to produce and to mount on the support plate, and yet it provides a relatively wide barrier for the children and is quite safe because its curved, closed end portion 46 eliminates any points or edges that may be hazardous to the children.

Figure 5:
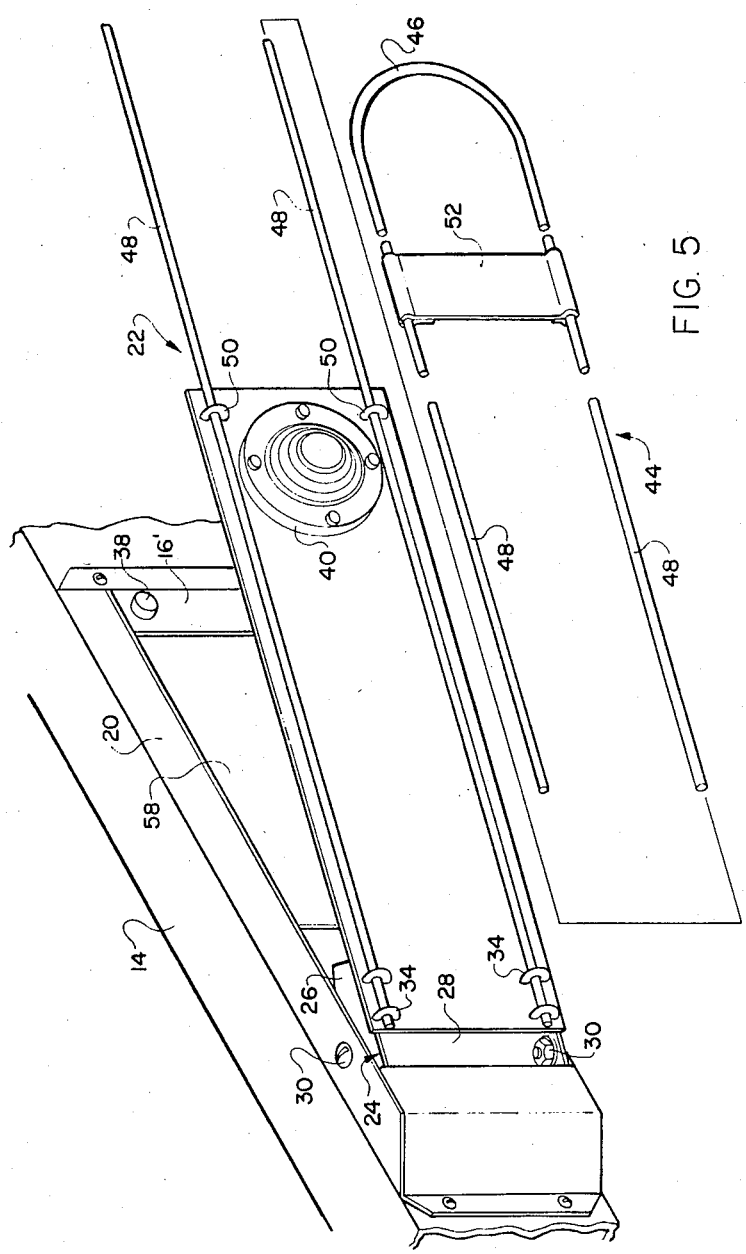
FIG. 5 is a perspective view illustrating an alternate embodiment of the crossing arm of the present invention.

An alternate embodiment of the present invention is illustrated in FIG. 5, this alternate embodiment being generally similar to the embodiment shown in FIGS. 1-4, except that the frame 16' is modified to provide a generally enclosed hollow housing 58 that can be used to contain conventional mechanical arrangements (not shown) used to pivot the movable arm 22 between its extended and retracted positions where the above-described vacuum source is not available or is not used for some other reason. Because the housing 58 has an extent along the bumper 14, the resilient bumper 38 can be located at one of the housing 58 as shown in FIG. 5 to engage the support plate 32 at the retracted position of the movable arm 22, and the stepped end portion 36 of the support plate 32 can therefore be eliminated. Otherwise, the embodiment illustrated in FIG. 5 is identical to that described above in connection with FIGS. 1-4, and corresponding reference numerals are used to identify the same components in both embodiments.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. A crossing control arm for use on vehicles such as school buses to assist in protecting students walking in front of the vehicle, said crossing control arm comprising:
   (a) frame means adapted to be attached to the bumper of a vehicle;
   (b) a movable arm comprising,
      (i) support means mounted in said frame means by pivot means to permit pivoting of said movable arm between a retracted position adjacent said bumper and an extended position projecting outwardly from said bumper, said support means including a support plate having a substantial extent away from said pivot means;
      (ii) rod means including a closed end portion and leg portions extending from said closed end portion, the extending ends of said leg portions being secured to said support plate along said extent thereof;
   (c) selectively operable drive means for pivoting said movable arm between said retracted and extended positions thereof.

2. A crossing arm as defined in claim 1 and further characterized in that said rod means comprises a U-shaped rod having said end portion formed on a radius and having a pair of leg portions extending from said end portion in spaced parallel relation to one another, and in that each of said leg poritons is secured to said support plate at a plurality of locations spaced along said extent thereof to maintain said rod in a horizontal disposition.

3. A crossing arm as defined in claim 1 and further characterized in that said support means includes a pivot plate mounted at one end thereof to said frame means by said pivot means with said support plate extending from the opposite end of said pivot plate.

4. A crossing arm as defined in claim 3 and further characterized in that said frame means includes a pair of flanges extending outwardly from said bumper in spaced parallel relation to one another, and in that said pivot plate includes a pair of flanges extending in spaced parallel relation to one another and disposed in abutting relation with said frame means flanges to provide support for said pivot plate, said pivot means passing through said abutting flanges of said frame means and said pivot plate.

5. A crossing arm as defined in claim 4 and further characterized in that said frame means and said pivot plate are formed from a relatively heavy-gauge metal, and in that said support plate is formed of a material that is lighter in weight than said pivot plate.

6. A crossing arm as defined in claim 3 and further characterized in that said support plate has an extending length that is substantially greater than the extending length of said pivot plate, and in that said rod means has an extending length that is substantially greater than the extending length of said support plate.

7. A crossing control arm for use on vehicles such as school buses to assist in protecting students walking in front of the vehicle, said crossing control arm comprising:
   (a) a U-shaped frame adapted to be secured to the bumper of said vehicle in abutment therewith and having a pair of flanges extending outwardly from said bumper in spaced parallel relation, said frame being formed of relatively heavy-gauge metal;
   (b) a movable arm comprising,
      (i) a U-shaped pivot plate formed with a flat base portion and a pair of flanges extending therefrom in spaced parallel relation, said pivot plate being formed of a relatively heavy gauge metal and being disposed with said flanges thereof in abutment with said frame flanges, respectively, to provide support for said pivot plate;
      (ii) pivot means passing through said abutting flanges adjacent one end of said pivot plate to permit pivoting movement of said pivot plate between a retracted position adjacent said bumper and an extended position projecting outwardly from said bumper;
      (iii) a support plate fixed to said pivot plate to extend from the other end thereof, said support plate being formed of a relatively light-gauge metal and having an extending length from said pivot plate that is substantially greater than the extending length of said pivot plate from said pivot means;
      (iv) a U-shaped rod having a closed end portion and two leg portions extending from said closed end portion in spaced parallel relation, the ends of said leg portions being positioned along the extending length of said support plate and secured thereto, and said leg portions having an extending length that is substantially greater than said extending length of said support plate; and
   (c) selectively operable drive means for pivoting said movable arm between said retracted and extended positions thereof.

8. A crossing control arm for use on vehicles such as school buses to assist in protecting students walking in front of said vehicle, said crossing control arm comprising:
   (a) frame means adapted to be attached to the bumper of said vehicle;

(b) movable arm means including,
  (i) a pivot element joined adjacent one end thereof to said frame means by pivot means for pivotal movement between a retracted position alongside said bumper and an extended position projecting outwardly from said bumper, said pivot element being formed of relatively heavy-gauge material and having a relatively short extending length from said pivot means;
  (ii) a support element fixed to the other end of said pivot element to extend therefrom, said support element being formed of relatively light-gauge material and having an extending length that is substantially greater than the extending length of said pivot element; and
  (iii) a rod member having a closed end portion and a pair of leg portions extending in spaced parallel relation and being secured to said support element along the extending length thereof, said rod member having an extending length from said support element that is substantially greater than said extending length of said support element; and
(c) selectively operable drive means for pivoting said movable arm means between said retracted and extended positions thereof.

* * * * *